United States Patent [19] [11] 4,076,581

Avis [45] Feb. 28, 1978

[54] METHOD FOR INCREASING WET STRENGTH CURE RATE OF PAPER

[75] Inventor: Robert P. Avis, West Chester, Pa.

[73] Assignee: Scott Paper Company, Philadelphia, Pa.

[21] Appl. No.: 649,647

[22] Filed: Jan. 16, 1976

[51] Int. Cl.[2] .......................... D21D 3/00; D21H 3/24; D21H 3/52

[52] U.S. Cl. .................................... 162/167; 162/177; 162/183; 162/190

[58] Field of Search ............... 162/166, 167, 177, 183, 162/190

[56] References Cited

U.S. PATENT DOCUMENTS

| | | | |
|---|---|---|---|
| 2,297,698 | 10/1942 | Freeman | 162/167 X |
| 2,572,932 | 10/1951 | Horsey et al. | 162/177 |
| 2,601,598 | 6/1952 | Daniel et al. | 162/167 |
| 2,622,979 | 12/1952 | Keim | 162/167 |
| 2,668,111 | 2/1954 | Lindquist | 162/166 |
| 2,711,370 | 6/1955 | Lurie | 162/166 |
| 2,766,137 | 10/1956 | Ashton et al. | 162/177 X |
| 2,826,500 | 3/1958 | Keim | 162/167 |
| 3,002,881 | 10/1961 | McDonnell et al. | 162/167 X |
| 3,275,605 | 9/1966 | Eastes et al. | 162/167 X |
| 3,630,831 | 12/1971 | Jongettes | 162/167 X |
| 3,953,638 | 4/1976 | Kemp | 156/209 X |

OTHER PUBLICATIONS

Casey, Pulp & Paper, vol. 2, 1960, pp. 1138, 1139 & 947.

*Primary Examiner*—Arthur L. Corbin
*Attorney, Agent, or Firm*—Nicholas J. DeBenedictis; John W. Kane; William J. Foley

[57] ABSTRACT

Wet-lay papermaking processes employing urea-formaldehyde resin in a papermaking slurry for imparting wet strength to the paper, are improved by addition of a water soluble salt of carboxymethylcellulose to the papermaking slurry, preferably when the urea-formaldehyde resin is dispersed in the slurry. The carboxymethylcellulose salt substantially increases the wet strength cure rate of the paper without significantly affecting the ultimate wet strength properties imparted to the paper by the cured urea-formaldehyde resin.

6 Claims, No Drawings

METHOD FOR INCREASING WET STRENGTH CURE RATE OF PAPER

BACKGROUND OF THE INVENTION

1. Field of the Invention

The invention concerns wet-lay papermaking and improving the performance of urea-formaldehyde wet strength resins in making wet strengthened paper.

2. Description of the Prior Art

The principal method of incorporating urea-formaldehyde wet strength resins into a sheet of paper is by adding the wet strength resin to a pulp slurry at some point in the wet end (white water system and pulp slurry system) of the papermaking process. For example, wet strength resins and other chemicals have been added to the beater chest, quick mix chest, machine chest, storage chests, suction side of the fan pump (head box pump), and other convenient points for addition of chemicals to the papermaking system prior to sheet formation. During sheet formation the pulp slurry exits the head box and the pulp is deposited upon a foraminous surface while water passes through the foraminous surface. The white water pasing through the sheet is usually collected in paper machine vessels such as the white water chest, couch pit, or riffler where the white is accumulated and recycled in the papermaking process.

Chemicals added to the pulp slurry for imparting strength to the paper product are classified as either dry strength additives or wet strength additives. Dry strength additives such as carboxymethylcellulose break down when exposed to water and lose their strength imparting capabilities. Wet strength additives resist the action of water to impart strength to the paper when wet.

Most wet strength resins added to the papermaking slurry have an affinity for the cellulosic fibers in the papermaking slurry. The resins' affinity for papermaking fibers is obtained by ionic charge. Such resins are referred to in the industry as substantive resins. Cationic resins naturally have the appropriate affinity for cellulosic fibers. Resins can be made cationic by incorporating some cationic components into the resin during the manufacture of the resin. Urea-formaldehyde resns are made substantive to cellulosic fibers by incorporating some cationic charge into the urea-formaldehyde polymer. This is usually accomplished by including a cationic monomer such as an amine along with the urea and formaldehyde during the manufacture of the urea-formaldehyde resin. Such cationically modified urea-formaldehyde resins are referred to as substantive urea-formaldehyde resins and are disclosed in U.S. Pat. Nos. 3,275,605, issued Sept. 27, 1966; 2,554,475, issued May 22, 1951 and 2,683,134 issued July 6, 1954.

Substantive urea-formaldehyde resins have been used to impart wet strength to paper by incorporating the urea-formaldehyde resin into the pulp slurry prior to sheet formation. Drying of the sheet after formation partially cures the urea-formaldehyde resin attached to the fibers comprising the sheet. However paper made with urea-formaldehyde resin requires natural aging of several weeks before the paper achieves its full wet strength potential. In fact, paper coming off the papermaking machine has only a small fraction (e.g. about 30% or less) of the wet strength potential obtainable upon aging.

Water soluble salts of carboxymethylcellulose have been used in papermaking as a dry strength additive. Because of the water solubility of carboxymethylcellulose, paper having enhanced dry strength due to the presence of carboxymethylcellulose readily disintegrates in the presence of water (lacks wet strength). Accordingly carboxymethycellulose is referred to as a dry strength additive usually used in the manufacture of corrugated board and other paper products such as kraft paper which require high strength but not necessarily wet strength.

U.S. Pat. No. 3,630,831 is an example of the many disclosures teaching the use of carboxymethylcellulose as a binding agent for non-woven materials. U.S. Pat. No. 2,766,137 discloses the use of an ammonium salt of carboxymethylcellulose for treating fibrous products to impart some wet strength. However, the salt is decomposed into the free acid which is further decomposed to the "refractory" state.

U.S. Pat. No. 2,297,698 is one example of the use of water soluble cellulosic compounds such as hydroxyalkylcellulose and the alkali metal salts thereof in combination with other ingredients such as urea-formaldehyde resin and polyhydric alcohol for treating bibulous paper.

The above patents do not teach the synergistic affect of salts of carboxymethylcellulose upon the cure rate of substantive urea-formaldehyde resin when added to the pulp slurry which is particularly surprising since the carboxymethylcellulose salt by itself does not impart any wet strength nor does the combination significantly affect the final wet strength of the paper.

One function of a wet strength resin is to impart sufficient strength to the paper while still wet on the machine in order to minimize paper breaks during high speed papermaking. A second function of a wet strength resin is to impart the desired degree of wet strength to the final product which depends upon the desired end use of the paper product. A disadvantage of urea-formaldehyde resin is that the quantity needed to perform the first function (strengthen the sheet to minimize breaks on the papermaking machine at high speeds) is often much larger than the quantity of resin needed to give the ultimate wet strength desired for the paper product after aging. This excess quantity of urea-formaldehyde resin needed to impart sufficient strength on the papermaking machine is wasted in the ultimate product and a method of increasing the cure rate of the urea-formaldehyde resin to increase the on machine wet strength would be highly desirable and eliminate this waste of urea-formaldehyde resin.

U.S. Pat. Application Ser. No. 419,022, filed Nov. 26, 1973, now U.S. Pat.No. 3,953,638 inventor Clifford B. Kemp, available as a priority document for French patent disclosure 2,252,212, published on July 25, 1975 discloses the ability of carboxylmethylcellulose to improve the wet strength of paper in combination with a wet strength resin such as Kymene S-2064. Kymene S-2064 is an alkaline-curing wet strength resin believed to be a polyaminepolyamide-epichlorohydrin resin (cationic) available from Hercules Incorporated, Wilmington, Delaware. In contrast, the present invention does not improve the wet strength of paper produced utilizing urea formaldehyde resin but improves the cure rate (off machine strength) of the paper without significantly affecting the ultimate wet strength. The relevant disclosure in U.S. Pat. Application Ser. No. 419,022 is on page 30. However, the publication date of July 25, 1975 is after the conception and reduction to practice of the present invention.

SUMMARY OF THE INVENTION

This invention increases the cure rate of urea-formaldehyde resin for imparting wet strength to paper and accordingly the wet strength cure rate of the paper is increased. Specifically, in a wet lay papermaking process employing a substantive urea-formaldehyde resin in a papermaking slurry for imparting wet strength to paper produced by depositing papermaking fibers contained in the slurry upon a foraminous surface with the water component of the slurry draining through the foraminous surface, wherein the improvement comprises separately adding to the papermaking slurry an activating amount of a water soluble salt of carboxymethylcellulose and the substantive urea-formaldehyde resin, said carboxymethylcellulose having a degree of substitution of from about 0.3 to about 1.1. Preferably the carboxymethylcellulose is added to the slurry to provide from about 0.05% to about 1.5% carboxymethylcellulose based upon the weight (air dried) of cellulosic fibers contained in the slurry. The invention is based upon a discovery of a synergistic relationship between water soluble salts of carboxymethylcellulose and substantive urea-formaldehyde resin when added separately to a papermaking slurry to insure that the one component, preferably the resin is dispersed prior to addition of the second component, preferably the carboxymethylcellulose.

In addition to improving the cure rate, the combination of carboxymethylcellulose and urea-formaldehyde resin also results in improved retention of fibers, and serves as a drainage aid. These properties allow the opportunity (1) to increase paper machine speed (2) finish "hot" paper (rather than aging inventory or store paper until sufficient strength has been developed) (3) reduced refining in order to improve handfeel, bulk, absorbency and water holding capacity (4) reduce resin consumption (5) to use lower quality pulps to produce comparable paper products (6) reduce fiber loss to sewer and (7) energy savings in dryer section of paper machine.

DETAILED DESCRIPTION OF THE INVENTION AND THE PREFERRED EMBODIMENTS

Wet strength urea-formaldehyde resins suitable for use in the present invention are usually produced by reacting urea and formaldehyde in the presence of a cationically charged chemical capable of participating in the urea-formaldehyde polymerization and which will impart a cationic characteristic to the resulting urea-formaldehyde resin sufficient to make the resin substantive to cellulosic fibers.

Typically, cationic urea-formaldehyde resins contain as a cationic modifier, a polyalkylene polyamine of the formula

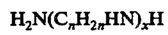

$$H_2N(C_nH_{2n}HN)_xH$$

in which X is one or more and $n$ is 2 or 3, as for example triethylenetetramine or diethylenetriamine. Additionally, condensation products of these polyalkylene polyamines with halohydrins, such as alpha dichlorohydrin or epichlorohydrin, with alkylol amines, such as monoethanolamine or triethanolamine, or with formaldehyde or other aldehyde to a water-soluble, low stage reaction may also be employed as an added component in the basic urea-formaldehyde reaction mixture.

These complex amine-modified, urea-formaldehyde resins are characterized generally by more favorable solubility properties in beater application under slightly acid conditions than the conventional urea-formaldehyde resins. Furthermore, there is an increased substantivity of these modified resins toward fibers of cellulosic material, such as paper pulp in aqueous suspension, or, in other words, the resin is selectively adsorbed by the cellulose fibers to enhance the efficiency of the operation. This increased adsorption of the modified resin by the paper pulp is thought to result from the cationic charge on the resin occasioning an attractive force directed toward the negatively charged cellulose fibers. Resins of these general types are described in detail in U.S. Pat. Nos. 2,554,475 and 2,683,134 dated May 22, 1951 and July 6, 1954, respectively.

The necessary characteristics of the urea-formaldehyde resin in order for it to be suitable for practicing the present invention is that the resin be water soluble and be substantive to the cellulosic fibers. Such resins will be referred to hereinafter as UFC resins.

Suitable water soluble salts of carboxymethycellulose can be produced by reacting alkali cellulose with monochloroacetate salt (e.g. sodium monochloroacetate) under appropriate conditions. Each anhydroglucose unit of the alkali cellulose contains three hydroxyl groups capable of entering into the substitution reaction in which a carboxymethyl group is substituted for a hydrogen on a hydroxyl group. The average number of carboxymethyl groups that are substituted per anhydroglucose unit is known as the "degree of substitution" or D.S. If all three hydroxyl groups are substituted in each anhydroglucose unit, a maximum degree of substitution of 3.0 is obtained. However, the degree of substitution found most suitable for the carboxymethylcellulose employed in the present invention is a D.S. of from about 0.3 to about 1.1 with about 0.7 being preferred. In addition to the sodium salt of carboxymethylcellulose, other salts are suitable provided they are water soluble. As a general rule, monovalent cations form a soluble salt of carboxymethylcellulose, divalent cations are borderline, and trivalent cations form insoluble salts. Examples of water soluble salts of carboxymethylcellulose include the sodium, ammonium, calcium, magnesium and potassium salts.

The preferred carboxymethylcellulose is sodium carboxymethylcellulose having a degree of substitution of about 0.7. Such a chemical is available from Hercules, Inc., Wilmington, Delaware as type 7 Hercules Cellulose Gum having various degrees of polymerization ranging from a molecular weight of less than about 80,000 to a molecular weight of in excess of 700,000.

For convenience, all water soluble salts of carboxymethylcellulose will be referred to hereinafter as CMC unless a specific salt is intended, in which case the cation will be included in the designation such as NaCMC for sodium carboxymethylcellulose.

When practicing the present invention, the sequence of addition of the CMC and the UFC resin is important, because it is necessary for one component, preferably the urea-formaldehyde resin, to be adequately dispersed in the pulp slurry prior to addition of the second component, preferably the CMC. This is conveniently accomplished in a conventional papermaking machine by employing separate points of addition such as by locating the point of addition of the CMC downstream of the point of addition of the urea-formaldehyde in the wet end of the papermaking machine. For example the UFC could be added to the stock chest or stuff box and the CMC could be added to the suction side of the fan pump or head box pump. Alternatively, the UFC could be added to the beater chest or the machine chest and the CMC added to the stock chest, stuff box or suction side of the head box pump. Separate points of addition in the broke storage, pulp mixing or pulp slurry pumping systems or the white water recycle system comprising the wet end of the paper machine prior to the head box are adequate for adding the UFC and the CMC since separate points of addition insure that the UFC will be dispersed prior to addition of the CMC.

Most papermaking machines have slight variations in their white water system and pulp handling system for making up the furnish for feeding and head box of the papermaking machine and for recycling the white water from the sheet formation section of the papermaking machine. Those skilled in the art could readily select points of addition in which the CMC is added downstream of the point of addition of the UFC. The significance of different points of addition is to insure dispersion of one component, preferably the UFC resin prior to the addition of the second component, preferably the CMC.

The amount of substantive urea-formaldehyde resin added depends upon the desired wet strength property of the paper. Usually from about 0.05% to about 5.0% based upon the air dried weight of the fibers is employed. The amount of CMC added to the furnish having the urea-formaldehyde dispersed therein is preferably from about 0.05% to about 1.5% based upon the air dry weight of cellulosic fibers in the furnish.

Preferrably the pH of the furnish is acidic with a pH of from about 3.5 to about 4.5 being most preferred.

EXAMPLE 1

Hand sheets of paper were prepared employing laboratory apparatus to demonstrate the synergistic effect between CMC and UFC (cationic urea-formaldehyde resin) in papermaking using various pulps. Seventeen sets of hand sheets were made differing in the amount and quantity of CMC and UFC added to the pulp slurry and in the type of pulp employed. Seven of the hand sheet sets were made with a kraft pulp (75% soft wood - 25% hard wood) and ten of the hand sheet sets were made with a sulfite pulp; both pulps having been refined to a Canadian freeness of 450 to 500 c.c. In preparing each hand sheet set, a pulp slurry was made having a consistency of about 2.2% and containing 60 grams (air dry basis) of pulp. The pulp slurry was placed in a British disintegrater which agitates the slurry. Then urea-formaldehyde wet-strength resin prepared according to U.S. Pat. No. 3,275,605 and NaCMC having a 0.7 D.S. and a molecular weight of about 700,000 (Hercules Cellulose Gum type 7H) were used in various quantities as indicated in Table I in making the hand sheets. The urea-formaldehyde resin was added to the disintegrater after one minute of agitation while a 0.5% solution of the NaCMC was added to the disintegrater after 5 minutes of agitation. After ten minutes of agitation, the pH of the slurry in the disintegrater was adjusted to 4.0 with a 10% solution of $H_2SO_4$. After 15 minutes, the agitation was stopped and the treated pulp slurry poured into a proportioning tank of a Noble and Wood apparatus for making hand sheets. The consistency of the slurry was adjusted in the tank to yield a hand sheet having a basis weight of 20 pounds per ream (2,880 square feet). The pH was readjusted to 4.0 with 10% $H_2SO_4$. Several hand sheets were then prepared from this slurry by metering a specific quantity of the pulp slurry into the deckel box of the Noble and Wood apparatus along with sufficient water to yield an 8 inch by 8 inch hand sheet which was then pressed and dried on the pressing and drying section of the Noble and Wood apparatus. Test strips were then prepared from the hand sheets and tested for both their dry and wet tensile strengths according to TAPPI Standard No. T456M-49 on a Thwing-Albert Tensile Tester. The tensile strength tests were performed after the sheets were produced to approximate the direct off machine tensile and the tests were repeated after two weeks and four weeks of natural aging. Test strips of each hand sheet were also subjected to high temperature curing for 3 minutes at 300° F and the wet and dry tensile of the heat-cured strips were also determined. The results are given in Table I.

EXAMPLE 2

The procedure of Example 1 was repeated using the same sulfite pulp and NaCMC but using different wet strength resins and adjusting the pH of the pulp slurry to the appropriate pH for the wet strength resin employed. The results are reported in Table 2. The resin designated MF is a melamine formaldehyde resin. The resin designated NC 630 is a neutral cure glyoxal acrylamide resin available from American Cyanide and made according to U.S. Pat. No. 3,554,932. The resin designated K557 is a polyamine-polyamide-epichlorohydrin resin available from Hercules Chemical Company as Kymene 557. The resin designated DFR is a polyureide formaldehyde resin made according to U.S. Pat. No. 3,772,225.

SIGNIFICANCE

Table 1 shows the synergistic improvement in off machine wet strength obtained with the combination of CMC and UFC in comparison to UFC or CMC alone. The hand sheets made without UFC or CMC (set No. 1) had an off machine wet tensile of 4.4 oz. When 0.5 percent CMC was added to the slurry without any UFC (set No. 2) the off machine wet tensile was only 3.6 oz. No improvement in wet strength was obtained upon natural aging of hand sheet sets 1 and 2. The hand sheet set made with 1.0% UFC and no CMC (set No. 4) had an off machine wet strength of 13.8 oz. which improved upon aging. In comparison, hand sheet set No. 7 had an off machine wet tensile of 31.5 oz. obtained with less CMC than the amount used in hand sheet set No. 2 and with the same amount of UFC used in hand sheet set No. 4. The difference between 13.8 and 31.5 is very significant (sets 4 and 7). However, the differences in the wet strength after four weeks of natural aging for the same hand sheets is not as significant.

Since the normal testing for wet strength is performed after natural aging of about four weeks or after heat-cured aging, the combination of UFC and CMC is not obvious since very little effect of the combination is detectable after heat curing at 300° F or after four weeks natural aging.

Hand sheet sets 1, 2 and 3 in Table I demonstrate that CMC by itself does not contribute to wet strength on natural aging. Hand sheet sets 6, 7, 9, 10, 13, 14, 16 and 17 show the effect of CMC upon UFC. Hand sheets 11 to 17 show the effect with a northern kraft pulp.

Surprisingly, a somewhat similar resin to urea-formaldehyde, melamine formaldehyde is not improved by the combination of melamine formaldehyde and CMC but the off machine wet tensile is significantly impaired (see hand sheets 9 and 10 in Table 2). The off machine wet strength of some resins are improved by the combination of the resin with CMC, but the improvement also shows up in the final naturally aged wet strength and the heat cured wet strength. Such interaction is more readily determinable by the standard industry procedure of testing wet strength after natural aging or heat curing. Other resins such as NC630do not appear to be affected by the presence of carboxymethycellulose in either the off machine wet tensile or the aged wet tensile.

The pH of the slurries used to make the hand sheet sets reported in Tables I and II was adjusted to the optimum pH for the wet strength resin employed in manufacturing the hand sheet. For UFC this optimum pH is about 4.0.

EXAMPLE 3

A conventional, commercial, papermaking machine employing a fourdrinier wire and a white-water system having recycle capabilities was employed to test the combination of CMC and UFC. A 0.5 percent solution of NaCMC having a 0.7 D.S. and a molecular weight of about 700,000 was added to the pulp slurry (furnish) on the suction side of the fan pump which is the pump supplying furnish to the head box. The CMC was added in an amount sufficient to add 0.13% CMC based upon the air-dry weight of fibers in the furnish. Urea-formaldehyde resin produced according to U.S. Pat. No. 3,275,605 was added to the stuff box (upstream of the fan pump) in amount equal to 2.0% by weight of the fibers in the furnish. The stuff box in the papermaking machine functions as a reservoir to supply high consistency furnish to the suction side of the fan pump. Within a short period of time, the off machine wet tensile of paper being produced by the papermaking machine increased from 7–8 ounces to about 11–13 ounces which permitted direct finishing of the paper product (finishing of "hot paper") without the necessity of aging the paper to develop wet strength. The retention of fibers on the fourdrinier screen (first pass retention) increased from about 80–85% up to about 86–92%. This increase in retention was accompanied by a decrease in the consistency of the white water in the tray from about 8–10% to about 4–6% which indicates a decrease in the fibers in the white water after sheet formation. Head box drainage on the papermaking machine increased from the range of from about 200–250cc to about 350cc initially, then up to 450cc when the amount of refining of the pulp was decreased. The high initial off-machine wet tensiles due to the CMC-UFC combination allowed a reduction in the quality of pulp being used to make up the furnish for the papermaking machine from a significant quantity of hgh quality kraft pulp to a less expensive pulp having less strength with the paper being produced continuing to meet the tensile strength specifications for the product being produced. Papermaking machine speed was increased by about 30 feet per minute without overloading the dryer systems of the machine due to the increased drainage accompanying the combination of CMC and UFC added to the papermaking system.

SIGNIFICANCE

The addition of CMC to a papermaking machine which recycles the white water for use in the make up of pulp slurry (furnish) results in a decrease in the quantity of CMC needed to be an activating amount for increasing the cure rate of UFC. As can be seen in Example 3, a significant increase in the off machine wet tensile was obtained with the use of 0.13% CMC based upon the air dry weight of fibers in the furnish. However in Example 1 the use of 0.1% CMC (hand sheet No. 5) did not increase the off machine wet tensile in a laboratory procedure for making hand sheets without a white water recycle system. Accordingly, the activating amount of CMC for increasing the wet strength cure rate of UFC depends upon the white-water system of the papermaking machine employed and in particular upon the recycle characteristics of that machine which will influence the buildup of CMC in the white water system.

A comparison of the off machine wet tensile strength for hand sheet sets 4, 5, and 6 in Table I demonstrates that there is an activating amount of CMC required in th pulp slurry in order for an increase in the off machine wet strength to be manifested by the combination of UFC and CMC. The results of Examples I and II suggest that with the resin concentration, pulp consistency and water system without a recycle used in Example I and II, the activating amount of CMC in the pulp slurry is slightly less than about 0.2% CMC addition to the pulp slurry based upon the air dry weight of fibers in the slurry. However, the activating amount of CMC is dependent upon papermaking variables such as the resin concentration, pulp consistency, characteristics of the white water system and the recycle of the water used in making the pulp slurry. In addition, the point of addition of the CMC to the papermaking process seems to affect the optimization of the invention. When the CMC is added to the papermaking process at a point where the pulp furnish is at a high consistency and the urea-formaldehyde resin is dispersed in the pulp slurry, the effectiveness of the CMC seems to be enhanced.

The white water system employed in Example III recycled substantial quantities of the water used in papermaking to make up the pulp slurry and, accordingly, substantial effects were produced with a CMC addition of only 0.13% based upon the air dry weight of fibers in the pulp slurry.

The optimum point of addition for the CMC and the amount of CMC that will optimize the activation of the curing of UFC to produce high off machine wet tensile strength will vary depending upon the characteristics of the papermaking process in which the invention is employed. However, the addition of between about 0.05% to about 0.5% CMC based upon the air dry weight of fibers in the pulp slurry should produce optimum results in commercial papermaking processes employing a water recycle system.

TABLE I

| | | | | | CMC/UFC | | | | | | | |
|---|---|---|---|---|---|---|---|---|---|---|---|---|
| | | | | | OFF MACHINE | | 2 WEEKS AGING | | 4 WEEKS AGING | | CURED AT 300° F. | |
| Set # | pH | Pulp | % CMC | % Resin | oz. W.T. | oz. D.T. | oz. W.T. | oz. D.T. | oz. W.T. | oz. D.T. | oz. W.T. | oz. D.T. |
| 1 | 4.0 | S.V.* | — | — | 4.4 | 141.0 | 4.3 | 139.8 | 4.3 | 144.5 | 7.5 | 150.4 |
| 2 | 4.0 | S.V. | .5 | — | 3.6 | 168.5 | 4.1 | 151.1 | 4.4 | 168.5 | 12.3 | 147.4 |
| 3 | 4.0 | S.V. | — | — | 3.0 | 143.0 | 4.0 | 117.5 | 3.9 | 132.4 | 9.6 | 129.0 |
| 4 | 4.0 | S.V. | — | 1.0 | 13.8 | 144.1 | 26.6 | 137.0 | 30.3 | 133.4 | 55.6 | 147.5 |
| 5 | 4.0 | S.V. | .1 | 1.0 | 11.8 | 140.3 | 24.1 | 144.3 | 28.4 | 145.0 | 47.0 | 157.3 |
| 6 | 4.0 | S.V. | .2 | 1.0 | 17.1 | 157.6 | 30.9 | 151.6 | 35.1 | 161.4 | 49.8 | 149.8 |
| 7 | 4.0 | S.V. | .4 | 1.0 | 31.5 | 165.5 | 39.1 | 174.5 | 44.0 | 179.4 | 60.3 | 164.4 |
| 8 | 4.0 | S.V. | — | 2.0 | 21.2 | 150.3 | 38.1 | 158.7 | 47.4 | 167.7 | 76.1 | 181.8 |
| 9 | 4.0 | S.V. | .2 | 2.0 | 26.0 | 162.9 | 43.0 | 143.4 | 50.7 | 169.9 | 72.1 | 144.0 |
| 10 | 4.0 | S.V. | .4 | 2.0 | 31.4 | 188.5 | 46.3 | 182.0 | 52.7 | 188.5 | 73.2 | 179.8 |
| 11 | 4.0 | P.O.** | — | — | 6.3 | 220.5 | 6.9 | 234.1 | 6.0 | 230.1 | 8.9 | 239.5 |
| 12 | 4.0 | P.O. | — | 1.0 | 10.8 | 255.0 | 31.6 | 249.0 | 38.1 | 247.6 | 62.9 | 274.5 |
| 13 | 4.0 | P.O. | .5 | 1.0 | 31.8 | 264.5 | 51.1 | 273.5 | 56.4 | 286.5 | 76.5 | 282.5 |
| 14 | 4.0 | P.O. | 1.0 | 1.0 | 38.6 | 288.0 | 51.9 | 278.5 | 55.4 | 272.0 | 79.5 | 284.0 |
| 15 | 4.0 | P.O. | — | 2.0 | 24.1 | 245.0 | 52.5 | 261.6 | 62.5 | 247.8 | 110.1 | 275.0 |
| 16 | 4.0 | P.O. | .5 | 2.0 | 47.4 | 298.0 | 71.5 | 290.0 | 83.5 | 301.5 | 112.5 | 293.1 |
| 17 | 4.0 | P.O. | 1.0 | 2.0 | 43.1 | 275.3 | 63.8 | 285.1 | 69.8 | 286.9 | 103.1 | 282.5 |

*Sulfite Pulp
**Kraft Pulp

TABLE II

| | | | | | CMC With Other Wet Strength Resins | | | | | | | |
|---|---|---|---|---|---|---|---|---|---|---|---|---|
| | | | | | OFF MACHINE | | 2 WEEKS AGING | | 4 WEEKS AGING | | CURED AT 300° F. | |
| Set # | pH | Pulp | % CMC | % Resin | oz. W.T. | oz. D.T. | oz. W.T. | oz. D.T. | oz. W.T. | oz. D.T. | oz. W.T. | oz. D.T. |
| 1 | 4.0 | S.V.* | — | — | 3.4 | 136.5 | 4.9 | 136.4 | 4.9 | 135.3 | 7.0 | 137.0 |
| 2 | 4.0 | S.V. | — | 1.0 DFR | 24.8 | 157.5 | 45.8 | 141.0 | 44.0 | 158.4 | 64.8 | 164.6 |
| 3 | 4.0 | S.V. | .4 | 1.0 DFR | 41.5 | 175.0 | 50.4 | 163.6 | 54.5 | 171.5 | 55.9 | 175.3 |
| 4 | 7.0 | S.V. | — | 1.0 K557 | 17.1 | 146.0 | 31.3 | 160.1 | 32.4 | 154.6 | 46.3 | 161.5 |
| 5 | 7.0 | S.V. | .4 | 1.0 K557 | 35.0 | 167.3 | 45.0 | 169.9 | 48.5 | 166.4 | 55.9 | 162.0 |
| 6 | 7.0 | S.V. | — | .5 NC | 33.7 | 167.9 | 38.6 | 163.6 | 39.5 | 178.0 | 22.0 | 153.0 |
| 7 | 7.0 | S.V. | .4 | .5 NC | 37.0 | 174.3 | 37.5 | 166.1 | 36.3 | 159.3 | 21.8 | 150.9 |
| 8 | 4.0 | S.V. | — | — | 3.6 | 145.3 | 3.8 | 142.6 | 4.6 | 142.3 | 6.5 | 130.5 |
| 9 | 4.0 | S.V. | — | .5 MF | 21.0 | 157.5 | 31.3 | 148.6 | 35.9 | 159.4 | 51.4 | 145.9 |
| 10 | 4.0 | S.V. | .25 | .5 MF | 8.0 | 156.7 | 7.8 | 136.5 | 10.3 | 142.3 | 19.0 | 126.6 |
| 11 | 4.0 | S.V. | .5 | .5 MF | 9.7 | 164.8 | 13.7 | 146.5 | 15.1 | 153.7 | 32.9 | 148.4 |
| 12 | 4.0 | S.V. | — | 1.0 MF | 33.5 | 169.9 | 43.1 | 148.4 | 43.3 | 160.8 | 66.8 | 174.6 |
| 13 | 4.0 | S.V. | .25 | 1.0 MF | 12.1 | 137.8 | 16.6 | 132.9 | 20.9 | 131.0 | 35.0 | 134.8 |
| 14 | 4.0 | S.V. | .5 | 1.0 MF | 10.1 | 140.2 | 12.4 | 127.0 | 13.4 | 131.5 | 27.3 | 129.5 |

*Sulfite Pulp

I claim:

1. In a wet lay papermaking process employing a papermaking slurry containing a substantive urea-formaldehyde resin in the papermaking slurry for imparting wet strength to paper produced by depositing fibers contained in the slurry upon a foraminous surface with the water component of the slurry draining through the foraminous surface, the improvement which comprises;

separately adding to the papermaking slurry a water soluble salt of carboxymethylcellulose and the substantive urea-formaldehyde, said carboxymethylcellulose having a degree of substitution of from about 0.3 to about 1.1 and added to the slurry in an amount sufficient to increase the wet strength cure rate of the paper.

2. The process of claim 1 wherein the amount of carboxymethylcellulose salt added to the papermaking slurry is sufficient to result in from about 0.05 to about 1.5 parts of carboxymethylcellulose salt per 100 parts by weight based upon the air dry weight of cellulosic fibers in the papermaking slurry.

3. The process of claim 1 performed continuously to produce paper with the substantive urea-formaldehyde resin added to the papermaking slurry at in an amount of from about 0.05 parts to about 5.0 parts per 100 parts by weight based upon the air dry weight of the cellulosic fibers in the slurry, said carboxymethylcellulose salt being added to the slurry in an amount of about 0.05 parts to about 1.5 parts by weight based upon 100 parts by weight of air dry cellulosic fibers in the slurry and the point of addition of the carboxymethylcellulose salt to the slurry in a continuous papermaking process being at a point downstream of the point of addition of the urea-formaldehyde resin.

4. The process of claim 3 wherein the urea-formaldehyde resin is added to the stuff box and the carboxymethylcellulose salt is added to the suction side of the fan pump used for pumping the slurry to the head box prior to formation of a paper sheet on the foraminous surface in a conventional papermaking process.

5. The process of claim 1 wherein the water soluble salt of carboxymethylcellulose is sodium carboxymethylcellulose having a degree of substitution of about 0.7.

6. The process of claim 3 wherein the water component of the slurry is collected after draining through the foraminous surface and recycled for use in the make up of additional pulp slurry.

* * * * *